(12) United States Patent
Yu et al.

(10) Patent No.: US 9,244,300 B2
(45) Date of Patent: Jan. 26, 2016

(54) ENGAGED TYPE LIQUID CRYSTAL MODULE

(71) Applicant: Shenzhen China Star Optoelectronics Technology Co., Ltd., Shenzhen (CN)

(72) Inventors: Gang Yu, Shenzhen (CN); Pei Jia, Shenzhen (CN); Liuyang Yang, Shenzhen (CN)

(73) Assignee: SHENZHEN CHINA STAR OPTOELECTRONICS TECHNOLOGY CO. LTD., Shenzhen (CN)

( * ) Notice: Subject to any disclaimer, the term of this patent is extended or adjusted under 35 U.S.C. 154(b) by 0 days.

(21) Appl. No.: 13/704,635

(22) PCT Filed: Nov. 2, 2012

(86) PCT No.: PCT/CN2012/083983
§ 371 (c)(1),
(2) Date: Dec. 17, 2012

(87) PCT Pub. No.: WO2014/067130
PCT Pub. Date: May 8, 2014

(65) Prior Publication Data
US 2015/0234225 A1 Aug. 20, 2015

(30) Foreign Application Priority Data
Oct. 30, 2012 (CN) .......................... 2012 1 0424164

(51) Int. Cl.
*G02F 1/1333* (2006.01)

(52) U.S. Cl.
CPC *G02F 1/133308* (2013.01); *G02F 2001/13332* (2013.01); *G02F 2001/133314* (2013.01)

(58) Field of Classification Search
CPC .......... G02F 2001/133317; G02F 2001/13332; G02F 1/133308; G02F 2201/46; G02F 2201/465; G02F 2001/133311; G02F 2001/133314; G02F 2001/133322; G02F 2001/133325; G02F 2001/133328; G02F 1/133608
See application file for complete search history.

(56) References Cited

U.S. PATENT DOCUMENTS

2007/0076139 A1* 4/2007 Bae ................................ 349/58
2011/0299006 A1* 12/2011 Cheng et al. .................... 349/58

FOREIGN PATENT DOCUMENTS

CN 101382674 A * 3/2009

* cited by examiner

*Primary Examiner* — Jessica M Merlin
(74) *Attorney, Agent, or Firm* — Mark M. Friedman

(57) ABSTRACT

The present invention discloses an engaged type liquid crystal module. By engaging a first groove disposed in the middle of an outer surface of a backlight module with a first flange of a front frame structure, it can assemble a liquid crystal module, and can save a volume occupied by screw members. The engaged type liquid crystal module according to the present invention can simplify the frame design of the liquid crystal module, and match with a corresponding outer housing of display device to process an assembly operation without screw members, so that it is further advantageous for a development trend that liquid crystal display is designed toward narrow frame.

10 Claims, 4 Drawing Sheets

ENGAGED TYPE LIQUID CRYSTAL MODULE

FIELD OF THE INVENTION

The present invention relates to a liquid crystal module, and more particularly to an engaged type liquid crystal module.

BACKGROUND OF THE INVENTION

A liquid crystal display (LCD) is a kind of flat panel display (FPD) which displays images by the property of the liquid crystal material. In comparison with other display devices, the LCD has the advantages in lightweight, compactness, low driving voltage and low power consumption, and thus has already become the mainstream product in the whole consumer market. However, the liquid crystal material of the LCD cannot emit light by itself, and must depend upon an external light source. Thus, the LCD further has a backlight module to provide the needed light source.

Generally speaking, backlight modules have been developed based on size requirements into edge lighting type structures and bottom lighting type structures, which are categorized by locations of lamp tubes thereof. A light source of the edge lighting type structures is a single light source placed aside, and a light source of the bottom lighting type structures is placed right beneath. The lamp tubes of the backlight modules must be featured with high brightness and a long lifespan, etc., and include cold cathode fluorescent lamps (CCFL), hot cathode fluorescent lamps, light emitting diodes (LED) and electroluminescence (EL), etc. Nowadays, with the rise of environmental consciousness, because that using LEDs as backlight sources has an advantage of energy saving and environmental protection in comparison with the CCFL, it thus becomes a trend in backlight development to replace the CCFL by the LEDs. Besides, by using LEDs as a backlight source, an LCD or LCD TV is further developed toward a design direction of narrow frame.

Referring now to FIG. 1, a cross-sectional side view of a traditional liquid crystal module is illustrated in FIG. 1. Specially explaining, for conveniently describing, the contents of this figure are shown with a simple and schematic method. A traditional liquid crystal module 90 comprises a back plate 91, a light guide plate and optical film assembly 92, a plastic housing 93, a liquid crystal panel 94 and a front frame 95. The back plate 91 is used for loading light sources (not shown) and the light guide plate and optical film assembly 92; the plastic housing 93 is disposed on an outer side of the back plate 91 downward from top to bottom, and fix the light guide plate and optical film assembly 92 to form a backlight module; the liquid crystal panel 94 is loaded on the plastic housing 93; and the front frame 95 fixes the liquid crystal panel 94 on the backlight module. However, in the assembly of the liquid crystal module 90, it is necessary to use a method of screw-connection to assemble the liquid crystal module 90 or fix whole of the liquid crystal module 90 into an outer housing of an LCD. It will occupy an extra volume in the liquid crystal module 90 whether the screw members are disposed in a perpendicular or horizontal direction. Besides, it will increase the assembly steps, and is disadvantageous for a development trend that LCD is designed toward narrow frame.

As a result, it is necessary to provide an engaged type liquid crystal module to solve the problems existing in the conventional technologies.

SUMMARY OF THE INVENTION

A primary object of the present invention is to provide an engaged type liquid crystal module so as to solve the problem existing in the conventional technologies: it is necessary to have screw members to assemble and fix a liquid crystal module.

To achieve the above object, the present invention provides an engaged type liquid crystal module, which comprises:

a base plate having a bottom surface and a plurality of side surfaces upward extended from side edges of the bottom surface, wherein a light guide plate and an optical film assembly are provided therein;

a plastic housing structure having a square-frame shape, wherein an inner bump is disposed in the middle of an inner surface thereof, and a first groove is disposed in the middle of an outer surface thereof; the space below the inner bump forms a first receiving space, and the space above the inner bump forms a second receiving space; the first receiving space is disposed in the side surfaces of the base plate, and the inner bump fixes the light guide plate and the optical film assembly;

a liquid crystal panel disposed in the second receiving space; and a front frame structure, which encloses in the outer side of the plastic housing structure downward from top to bottom and fixes the liquid crystal panel, and a first flange is disposed in the middle of an inner surface thereof, so that the first flange is correspondingly engaged into the first groove of the outer surface of the plastic housing structure, so as to engage the front frame structure onto the plastic housing structure; and a second groove is formed in the middle of the outer surface of the front frame structure corresponding to the first flange;

wherein the engaged type liquid crystal module is further provided with a front display frame and a back display frame, wherein the front display frame and the back display frame enclose the liquid crystal module; and a second flange is disposed in the middle of an inner surface of the front display frame, which is correspondingly to the second groove of the front frame structure, so that the second flange is correspondingly engaged into the second groove of the outer surface of the front frame structure, so as to position the liquid crystal module.

To achieve the above object, the present invention further provides an engaged type liquid crystal module, which comprises:

a base plate having a bottom surface and a plurality of side surfaces upward extended from side edges of the bottom surface, a light guide plate and an optical film assembly are provided therein;

a plastic housing structure having a square-frame shape, wherein an inner bump is disposed in the middle of an inner surface thereof, and a first groove is disposed in the middle of an outer surface thereof; the space below the inner bump forms a first receiving space, and the space above the inner bump forms a second receiving space; the first receiving space is disposed in the side surfaces of the base plate, and the inner bump fixes the light guide plate and the optical film assembly;

a liquid crystal panel disposed in the second receiving space; and a front frame structure, which encloses in the outer side of the plastic housing structure downward from top to bottom and fixes the liquid crystal panel, and a first flange is disposed in the middle of an inner surface thereof, so that the first flange is correspondingly engaged into the first groove of the outer surface of the plastic housing structure, so as to engage the front frame structure onto the plastic housing structure.

To achieve the above object, the present invention further provides an engaged type liquid crystal module, which comprises:

a backlight module, in which a first groove is disposed in the middle of an outer surface thereof;

a liquid crystal panel disposed on the backlight module.

a front frame structure, which encloses in the outer side of the backlight module downward from top to bottom and fixes the liquid crystal panel, and a first flange is disposed in the middle of an inner surface thereof, so that the first flange is correspondingly engaged into the first groove of the outer surface of the backlight module, so as to engage the front frame structure onto the backlight module.

In one embodiment of the present invention, the front frame structure comprises four separated side-wall portions.

In one embodiment of the present invention, the front frame structure comprises two separated side-wall portions.

In one embodiment of the present invention, the cross-sectional shape of the first groove is a semicircle.

In one embodiment of the present invention, the cross-sectional shape of the first groove is a triangle.

In one embodiment of the present invention, the cross-sectional shape of the first groove is a trapezoid.

In one embodiment of the present invention, a second groove is formed in the middle of the outer surface of the front frame structure corresponding to the first flange.

In one embodiment of the present invention, the engaged type liquid crystal module is further provided with a front display frame and a back display frame, wherein the front display frame and the back display frame enclose the liquid crystal module; and a second flange is disposed in the middle of an inner surface of the front display frame, which is correspondingly to the second groove of the front frame structure, so that the second flange is correspondingly engaged into the second groove of the outer surface of the front frame structure, so as to position the liquid crystal module.

In the present invention, by engaging a first groove disposed in the middle of an outer surface of a backlight module with a first flange of a front frame structure, it can assemble a liquid crystal module, and can save a volume occupied by screw members. The engaged type liquid crystal module according to the present invention can simplify the frame design of the liquid crystal module, and match with a corresponding outer housing of display device to process an assembly operation without screw members, so that it is further advantageous for a development trend that liquid crystal display is designed toward narrow frame.

DETAILED DESCRIPTION OF THE PREFERRED EMBODIMENTS

The foregoing objects, features and advantages adopted by the present invention can be best understood by Referring now to the following detailed description of the preferred embodiments and the accompanying drawings. Furthermore, the directional terms described in the present invention, such as upper, lower, front, rear, left, right, inner, outer, side and etc., are only directions Referring now to the accompanying drawings, so that the used directional terms are used to describe and understand the present invention, but the present invention is not limited thereto.

Figure 1:
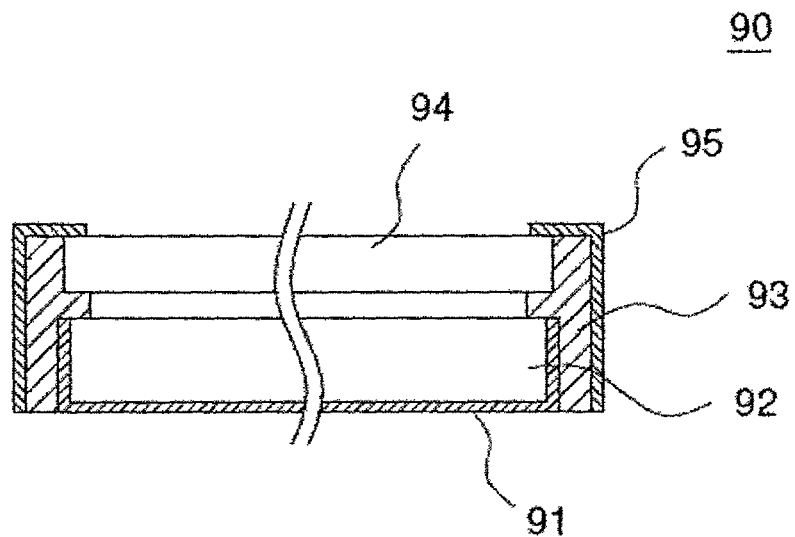
FIG. 1 is a cross-sectional side view of a traditional liquid crystal module.
Figure 2:
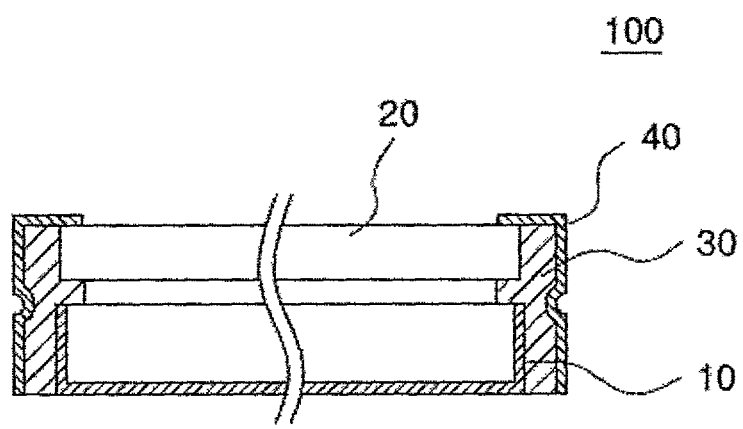
FIG. 2 is a cross-sectional side view of a liquid crystal module according to a first preferred embodiment of the present invention.
Figure 3:
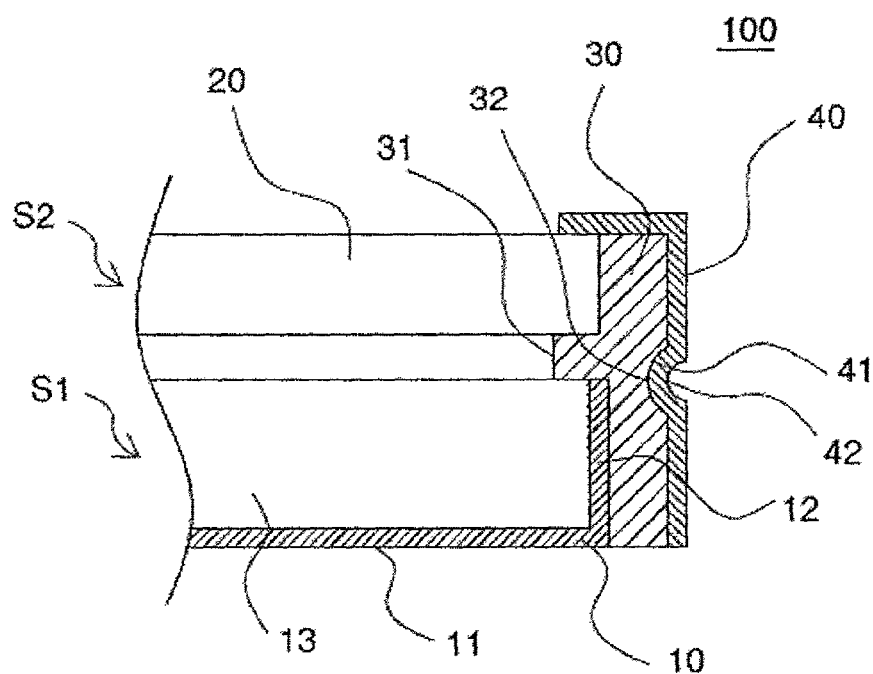
FIG. 3 is a partial enlarged view of FIG. 2.

Referring now to FIGS. 2 and 3, a cross-sectional side view of a liquid crystal module according to a first preferred embodiment of the present invention is illustrated in FIG. 2; and a partial enlarged view of FIG. 2 is illustrated in FIG. 3. Specially explaining, for conveniently describing, the contents of this figure are shown with a simple and schematic method. An engaged type liquid crystal module 100 according to the present invention comprises a base plate 10, a liquid crystal panel 20, a plastic housing structure 30 and a front frame structure 40. The base plate 10 has a bottom surface 11 and a plurality of side surfaces 12 upward extended from side edges of the bottom surface 11, and inside of the base plate 10, it is provided with a light source (not shown) and a light guide plate and optical film assembly 13; the plastic housing structure 30 is a square-frame shape, wherein an inner bump 31 is disposed in the middle of an inner surface thereof, and a first groove 32 is disposed in the middle of an outer surface thereof; the space below the inner bump 31 forms a first receiving space S1, and the space above the inner bump 31 forms a second receiving space S2; the first receiving space S1 is disposed in the side surfaces 12 of the base plate 10, and the inner bump 31 fixes the light guide plate and optical film assembly 13; the liquid crystal panel 20 is disposed in the second receiving space S2 of the plastic housing structure 30; and the front frame structure 40 encloses in the outer side of the plastic housing structure 30 downward from top to bottom and fixes the liquid crystal panel 20, and a first flange 41 is disposed in the middle of an inner surface of the front frame structure 40, so that the first flange 41 is correspondingly engaged into the first groove 32 of the outer surface of the plastic housing structure 30, so as to engage the front frame structure 40 onto the plastic housing structure 30.

Figure 4:
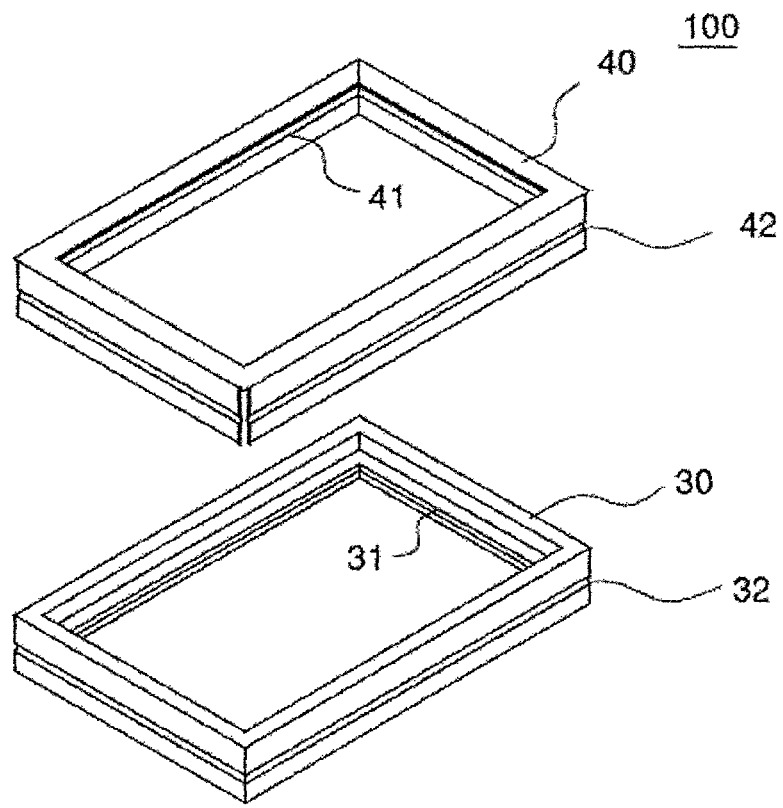
FIG. 4 is a perspective view of a plastic housing structure and a front frame structure according to the first preferred embodiment of the present invention.

Referring now to FIG. 4, a perspective view of a plastic housing structure and a front frame structure according to the first preferred embodiment of the present invention is illustrated in FIG. 4. The front frame structure 40 comprises four separated side-wall portions (unlabelled), so that the side-wall portions have an elasticity for slightly opening outward. The first flange 41 is disposed in the middle of the inner surface of the front frame structure 40, so as to correspondingly engage into the first groove 32 of the plastic housing structure 30. Besides, a second groove 42 is formed in the middle of the outer surface of the front frame structure 40 corresponding to the first flange 41.

Figure 5A:
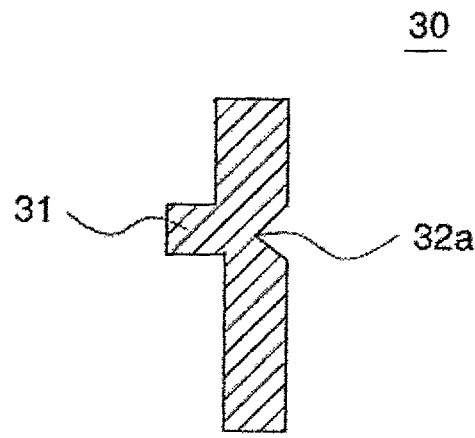
FIGS. 5A to 5B are cross-sectional shapes of a first groove of the plastic housing structure according to other embodiments of the present invention.
Figure 5B:
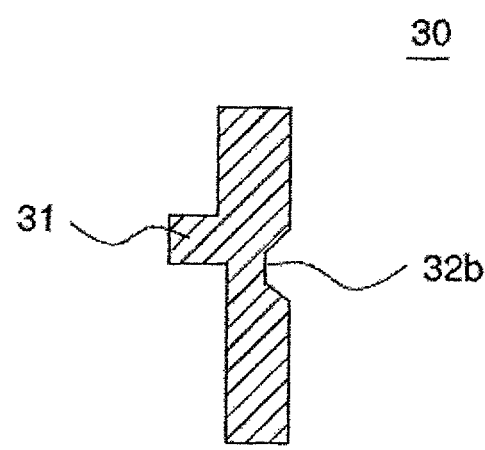

Moreover, the cross-sectional shape of the first groove 32 of the plastic housing structure 30 is preferably a semicircle, so it is advantageous for engagement. However, the shape of the first groove 32 is not limited in the present invention, such as shown in FIG. 5A, a first groove 32a with a cross-sectional of triangle; or as shown in FIG. 5B, a first groove 32b with a cross-sectional of trapezoid.

Therefore, in an assembly process of the liquid crystal module 100, by the engaged frame structure, it is not necessary to use a method of screw-connection to assemble the front frame 40, but using a method of engagement to assemble the liquid crystal module 100, so that it can save a volume occupied by screw members. Hence, it can simplify the frame design of the liquid crystal module 100, and is further advantageous for a development trend that liquid crystal display (LCD) is designed toward narrow frame.

Figure 6:
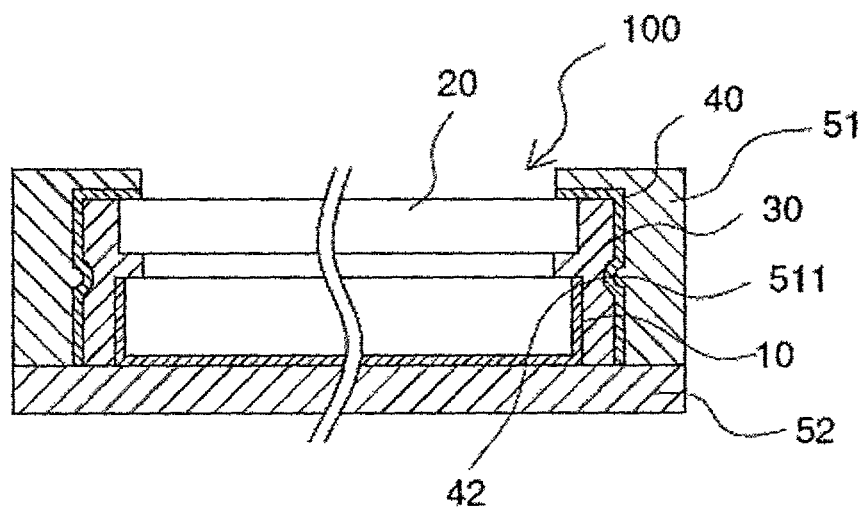
FIG. 6 is a cross-sectional side view showing the liquid crystal module according to the first preferred embodiment of the present invention is assembled into an outer housing of a display device.

Referring now to FIG. 6, a cross-sectional side view showing the liquid crystal module according to the first preferred embodiment of the present invention is assembled into a display device is illustrated in FIG. 6. The liquid crystal module 100 is further provided with a front display frame 51 and a back display frame 52, wherein the front display frame 51 and the back display frame 52 enclose the liquid crystal module 100. A second flange 511 is disposed in the middle of an inner surface of the front display frame 51, which is correspondingly to the second groove 42 of the front frame structure 40, so that the second flange 511 is correspondingly engaged into the second groove 42 of the outer surface of the front frame structure 40, so as to position the liquid crystal module 100. Hence, in the present invention, it is not necessary to design extra screw members to fix the liquid crystal module 100, so it can reduce a volume occupied by screw members, simplify the assembly steps, and is advantageous for a development trend that LCD is designed toward narrow frame.

Figure 7:
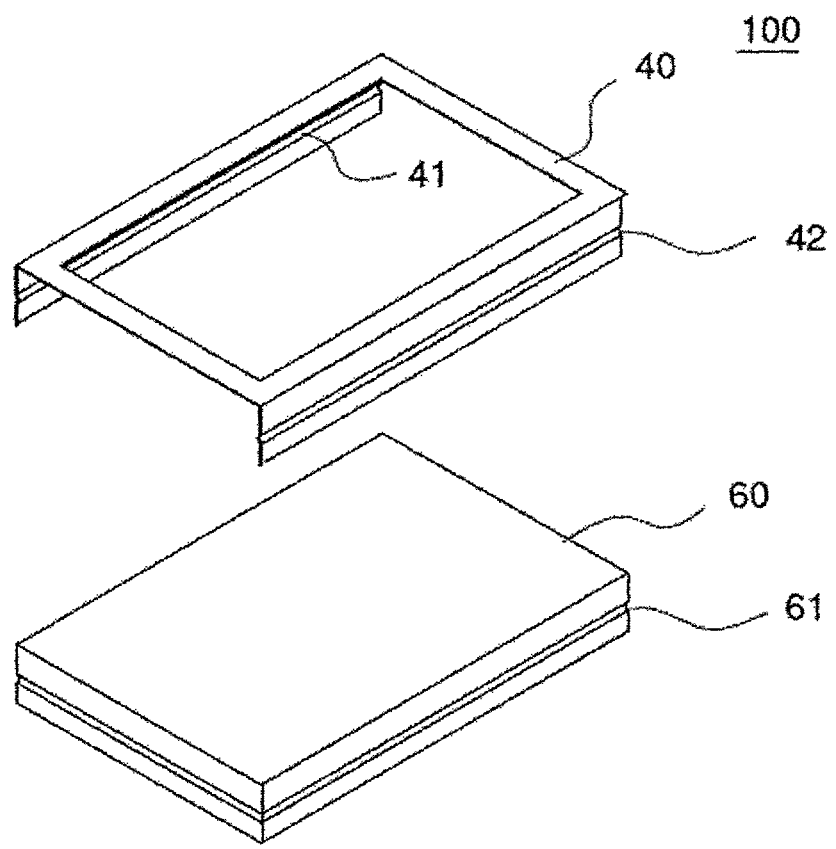
FIG. 7 is a perspective view of a backlight module and a front frame structure according to a second preferred embodiment of the present invention.

Referring now to FIG. 7, a perspective view of a backlight module and a front frame structure according to a second preferred embodiment of the present invention is illustrated in FIG. 7. The difference between the second preferred embodiment according to the present invention and the first preferred embodiment according to the present invention is that: structures which engage the whole of the liquid crystal module 100 are accomplished by a first groove 61 in the middle of an outer surface of a backlight module 60 and the first flange 41 of the front frame structure 40. The outer surface of the backlight module 60 does not limited in the present invention, which can be a back plate, a plastic housing or other portions thereof. Additionally, the front frame structure 40 comprises two corresponding and separated side-wall portions, so that the sidewall portions have an elasticity for slightly opening outward. By the engaged frame structure, it can use a method of engagement to assemble the liquid crystal module 100, so it can simplify the frame design of the liquid crystal module 100.

As described above, to compare with the traditional technology, it is necessary to use a method of screw-connection to assemble the liquid crystal module, so it will increase the assembly steps, and is disadvantageous for a development trend that LCD is designed toward narrow frame. In the present invention, by an engaged type liquid crystal module 100, in which a first groove 32, 61 disposed in the middle of an outer surface of a plastic housing 30 or backlight module 60 is engaged with a first flange 41 of a front frame structure 40 to assemble a liquid crystal module 100. Hence, it can save a volume occupied by screw members, simplify the frame design of the liquid crystal module 100, is further advantageous for a development trend that LCD is designed toward narrow frame, and can match with a corresponding outer housing of display device to process an assembly operation without screw members.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. An engaged type liquid crystal module, comprising:
   a base plate having a bottom surface and a plurality of side surfaces upward extended from side edges of the bottom surface, wherein a light guide plate and an optical film assembly are provided therein;
   a plastic housing structure having a square-frame shape, wherein an inner bump is disposed in the middle of an inner surface thereof, and a first groove is disposed in the middle of an outer surface thereof; the space below the inner bump forms a first receiving space, and the space above the inner hump forms a second receiving space; the first receiving space is disposed in the side surfaces of the base plate, and the inner bump fixes the light guide plate and the optical film assembly;
   a liquid crystal panel disposed in the second receiving space; and
   a front frame structure, which encloses in the outer side of the plastic housing structure downward from top to bottom and fixes the liquid crystal panel, and a first flange is disposed in the middle of an inner surface thereof, so that the first flange is correspondingly engaged into the first groove of the outer surface of the plastic housing structure, so as to engage the front frame structure onto the plastic housing structure; and a second groove is formed in the middle of the outer surface of the front frame structure corresponding to the first flange;
   wherein the front frame structure comprises four separated side-wall portions having an elasticity for slightly opening outward;
   wherein the engaged type liquid crystal module is further provided with a front display frame and a hack display frame, wherein the front display frame and the back display frame enclose the liquid crystal module; and a second flange is disposed in the middle of an inner surface of the front display frame, which is correspondingly to the second groove of the front frame structure, so that the second flange is correspondingly engaged into the second groove of the outer surface of the front frame structure, so as to position the liquid crystal module.

2. The engaged type liquid crystal module according to Claim 1, wherein the cross-sectional shape of the first groove is a semicircle, triangle, or trapezoid.

3. An engaged type liquid crystal module, comprising:
   a base plate having a bottom surface and a plurality of side surfaces upward extended from side edges of the bottom surface, wherein a light guide plate and an optical film assembly are provided therein;
   a plastic housing structure having a square-frame shape, wherein an inner bump is disposed in the middle of an inner surface thereof, and a first groove is disposed in the middle of an outer surface thereof; the space below the inner bump forms a first receiving space, and the space above the inner bump forms a second receiving space; the first receiving space is disposed in the side surfaces of the base plate, and the inner bump fixes the light guide plate and the optical film assembly;
   a liquid crystal panel disposed in the second receiving space; and a front frame structure, which encloses in the outer side of the plastic housing structure downward from top to bottom and fixes the liquid crystal panel, and a first flange is disposed in the middle of an inner surface thereof, so that the first flange is correspondingly engaged into the first groove of the outer surface of the plastic housing structure, so as to engage the front frame structure onto the plastic housing structure;

wherein the front frame structure comprises four separated side-wall portions having an elasticity for slightly opening outward.

4. The engaged type liquid crystal module according to claim 3, wherein the cross-sectional shape of the first groove is a semicircle, triangle, or trapezoid.

5. The engaged type liquid crystal module according to claim 3, wherein a second groove is formed in the middle of the outer surface of the front frame structure corresponding to the first flange.

6. The engaged type liquid crystal module according to claim 5, wherein the engaged type liquid crystal module is further provided with a front display frame and a hack display frame, wherein the front display frame and the back display frame enclose the liquid crystal module; and a second flange is disposed in the middle of an inner surface of the front display frame, which is correspondingly to the second groove of the front frame structure, so that the second flange is correspondingly engaged into the second groove of the outer surface of the front frame structure, so as to position the liquid crystal module.

7. An engaged type liquid crystal module, comprising:
a backlight module, in which a first groove is disposed in the middle of an outer surface thereof;
a liquid crystal panel disposed on the backlight module;
a front frame structure, which encloses in the outer side of the backlight module downward from top to bottom and fixes the liquid crystal panel, and a first flange is disposed in the middle of an inner surface thereof, so that the first flange is correspondingly engaged into the first groove of the outer surface of the backlight module, so as to engage the front frame structure onto the backlight module;

wherein the front frame structure comprises four separated side-wall portions having an elasticity for slightly opening outward.

8. The engaged type liquid crystal module according to claim 7, wherein the cross-sectional shape of the first groove is a semicircle, triangle, or trapezoid.

9. The engaged type liquid crystal module according to claim 7, wherein a second groove is formed in the middle of the outer surface of the front frame structure corresponding to the first flange.

10. The engaged type liquid crystal module according to claim 9, wherein the engaged type liquid crystal module is further provided with a front display frame and a back display frame, wherein the front display frame and the back display frame enclose the liquid crystal module; and a second flange is disposed in the middle of an inner surface of the front display frame, which is correspondingly to the second groove of the front frame structure, so that the second flange is correspondingly engaged into the second groove of the outer surface of the front frame structure, so as to position the liquid crystal module.

* * * * *

UNITED STATES PATENT AND TRADEMARK OFFICE
CERTIFICATE OF CORRECTION

PATENT NO. : 9,244,300 B2  
APPLICATION NO. : 13/704635  
DATED : January 26, 2016  
INVENTOR(S) : Gang Yu et al.

Page 1 of 1

It is certified that error appears in the above-identified patent and that said Letters Patent is hereby corrected as shown below:

In the claims:

Claim 6 column 7 line 21:
Change
-- a hack display --
to
"a back display"

Signed and Sealed this
Twenty-sixth Day of April, 2016

Michelle K. Lee
*Director of the United States Patent and Trademark Office*